(12) United States Patent
Grzonka et al.

(10) Patent No.: US 8,114,204 B2
(45) Date of Patent: Feb. 14, 2012

(54) WIRELESS RECEPTOR FOR COMMUNICATIONS WITHIN HOUSINGS

(75) Inventors: Michael T. Grzonka, Hudson, NH (US); Michael Joens, Beverly, MA (US); Aaron Burke, Hamilton, MA (US)

(73) Assignee: Millipore Corporation, Billerica, MA (US)

(*) Notice: Subject to any disclaimer, the term of this patent is extended or adjusted under 35 U.S.C. 154(b) by 0 days.

(21) Appl. No.: 12/879,674

(22) Filed: Sep. 10, 2010

(65) Prior Publication Data

US 2010/0328865 A1    Dec. 30, 2010

Related U.S. Application Data

(63) Continuation of application No. 11/581,618, filed on Oct. 16, 2006, now Pat. No. 7,811,365.

(51) Int. Cl.
*B01D 49/00* (2006.01)

(52) U.S. Cl. ............ 96/417; 55/DIG. 34; 95/273; 96/22; 96/24; 174/17 CT; 174/358; 439/86; 439/271

(58) Field of Classification Search ............. 55/DIG. 34; 95/273; 96/22, 24, 417; 174/17 CT, 358; 439/86, 271
See application file for complete search history.

(56) References Cited

U.S. PATENT DOCUMENTS

| | | | |
|---|---|---|---|
| 2,122,578 | A | 7/1938 | McMaster et al. |
| 3,720,322 | A | 3/1973 | Harms |
| 3,933,643 | A | 1/1976 | Colvin et al. |
| 4,401,089 | A | 8/1983 | Csaszar et al. |
| 4,662,692 | A | 5/1987 | Uken et al. |
| 5,192,424 | A | 3/1993 | Beyne et al. |
| 5,666,949 | A | 9/1997 | Debe et al. |
| 5,674,381 | A | 10/1997 | Den Dekker |
| 6,051,144 | A | 4/2000 | Clack et al. |
| 6,391,102 | B1 | 5/2002 | Bodden et al. |
| 6,537,444 | B2 | 3/2003 | Wilberscheid et al. |
| 6,551,503 | B2 | 4/2003 | Niers et al. |
| 6,558,444 | B1 | 5/2003 | Hunter |

(Continued)

FOREIGN PATENT DOCUMENTS

DE    202 15 058 U1    3/2003

(Continued)

OTHER PUBLICATIONS

Chinese communication dated Aug. 7, 2009 in corresponding foreign application (CN200710305101.X).

(Continued)

*Primary Examiner* — Jason M Greene
*Assistant Examiner* — Anthony Shumate
(74) *Attorney, Agent, or Firm* — Nields, Lemack & Frame, LLC

(57) ABSTRACT

The present invention provides a system and method for transmitting information between a device within a housing to a second device, preferably a test or monitoring unit, outside of the housing. There are numerous issues associated with transferring information from within a sealed housing to an external device. In some cases, the use of wires inside the housing may be impractical, due to internal conditions, such as fluid flow, pressure or temperature. In one embodiment, the antenna of the external RF reading device is electrically connected to the dome of the housing. In another embodiment, the device within the housing is electrically connected to a housing component. In another embodiment, the gasket is used to pass information from within the housing to an external device.

13 Claims, 2 Drawing Sheets

Stainless Steel Housing. The top connector, 10, and/or the housing base, 50, may contain various inlet and/or outlet configurations and constructions to mount filter cartridges.

U.S. PATENT DOCUMENTS

| | | |
|---|---|---|
| 7,001,451 B2 | 2/2006 | Kim |
| 7,048,775 B2 | 5/2006 | Jornitz et al. |
| 7,811,365 B2 | 10/2010 | Grzonka et al. |
| 2002/0144937 A1 | 10/2002 | Wilberscheid et al. |
| 2003/0047517 A1 | 3/2003 | Schoess |
| 2003/0168389 A1 | 9/2003 | Astle et al. |
| 2004/0256328 A1 | 12/2004 | Jornitz et al. |
| 2005/0027484 A1 | 2/2005 | Baumfalk et al. |
| 2005/0205658 A1 | 9/2005 | Baker et al. |
| 2006/0218991 A1 | 10/2006 | Baumfalk et al. |
| 2009/0243395 A1* | 10/2009 | Burke et al. ............ 307/104 |

FOREIGN PATENT DOCUMENTS

| | | |
|---|---|---|
| DE | 101 51 270 A1 | 5/2003 |
| WO | 2005/113112 A1 | 12/2005 |

OTHER PUBLICATIONS

Chinese communication dated Jun. 2, 2010 in corresponding foreign application (CN200710305101.X).

European communication dated Jan. 31, 2008 in corresponding foreign application (EP07254080.0).

European communication dated Jan. 30, 2009 in corresponding foreign application (EP07254080.0).

European communication dated Sep. 28, 2009 in corresponding foreign application (EP07254080.0).

European communication dated May 18, 2010 in corresponding foreign application (EP07254080.0).

European communication dated Nov. 17, 2010 in corresponding foreign application (EP10180333.6).

European communication dated Nov. 18, 2010 in corresponding foreign application (EP10181981.1).

European communication dated Nov. 23, 2010 in corresponding foreign application (EP10182057.9).

Office Action dated Sep. 17, 2009 in corresponding U.S. Appl. No.11/581,618—Now USP7811365.

Final Rejection Office Action dated Mar. 18, 2010 in corresponding U.S. Appl. No. 11/581,618—Now USP7811365.

Notice of Allowance Action dated July 15, 2010 in corresponding U.S. Appl. No. 11/581,618— Now USP7811365.

* cited by examiner

Figure 1: Stainless Steel Housing. The top connector, 10, and/or the housing base, 50, may contain various inlet and/or outlet configurations and constructions to mount filter cartridges.

WIRELESS RECEPTOR FOR COMMUNICATIONS WITHIN HOUSINGS

This application is a continuation of U.S. patent application Ser. No. 11/581,618, filed Oct. 16, 2006, the contents of which are incorporated herein by reference in their entirety.

BACKGROUND OF THE INVENTION

The use of wireless communication has become prevalent, especially in the management of assets, particularly those applications associated with inventory management. For example, the use of RFID tags permits the monitoring of the production line and the movement of assets or components through the supply chain.

To further illustrate this concept, a manufacturing entity may adhere RFID tags to components as they enter the production facility. These components are then inserted into the production flow, forming sub-assemblies in combination with other components, and finally resulting in a finished product. The use of RFID tags allows the personnel within the manufacturing entity to track the movement of the specific component throughout the manufacturing process. It also allows the entity to be able to identify the specific components that comprise any particular assembly or finished product.

In addition, the use of RFID tags has also been advocated within the drug and pharmaceutical industries. In February 2004, the United States Federal and Drug Administration issued a report advocating the use of RFID tags to label and monitor drugs. This is an attempt to provide pedigree and to limit the infiltration of counterfeit prescription drugs into the market and to consumers.

Since their introduction, RFID tags have been used in many applications, such as to identify and provide information for process control in filter products. U.S. Pat. No. 5,674,381, issued to Den Dekker in 1997, discloses the use of "electronic labels" in conjunction with filtering apparatus and replaceable filter assemblies. Specifically, the patent discloses a filter having an electronic label that has a read/write memory and an associated filtering apparatus that has readout means responsive to the label. The electronic label is adapted to count and store the actual operating hours of the replaceable filter. The filtering apparatus is adapted to allow use or refusal of the filter, based on this real-time number. The patent also discloses that the electronic label can be used to store identification information about the replaceable filter.

A patent application by Baker et al, published in 2005 as U.S. Patent Application Publication No. US2005/0205658, discloses a process equipment tracking system. This system includes the use of RFID tags in conjunction with process equipment. The RFID tag is described as capable of storing "at least one trackable event". These trackable events are enumerated as cleaning dates, and batch process dates. The publication also discloses an RFID reader that is connectable to a PC or an internet, where a process equipment database exists. This database contains multiple trackable events and can supply information useful in determining "a service life of the process equipment based on the accumulated data". The application includes the use of this type of system with a variety of process equipment, such as valves, pumps, filters, and ultraviolet lamps.

Another patent application, filed by Jornitz et al and published in 2004 as U.S. Patent Application Publication No. 2004/0256328, discloses a device and method for monitoring the integrity of filtering installations. This publication describes the use of filters containing an onboard memory chip and communications device, in conjunction with a filter housing. The filter housing acts as a monitoring and integrity tester. That application also discloses a set of steps to be used to insure the integrity of the filtering elements used in multi-round housings. These steps include querying the memory element to verify the type of filter that is being used, its limit data, and its production release data. This application also describes an internal transponder for relaying information to an external monitoring and test unit. An antenna is arranged adjacent to the transponder on the filter housing.

Despite the improvements that have occurred through the use of RFID tags, there are additional areas that have not been satisfactorily addressed. For example, there are issues associated with the ability to transmit data from within a filter housing to an external test or monitoring device.

SUMMARY OF THE INVENTION

The shortcomings of the prior art are overcome by the present invention, which describes a system and method for transmitting information between the interior of a housing and the exterior of that housing, such as between a device within the housing to a second device, preferably a test or monitoring unit, outside of the housing. There are numerous issues associated with transferring information from within a sealed housing to an external device. In some cases, the use of wires inside the housing may be impractical, due to internal conditions, such as fluid flow, pressure or temperature. In one embodiment, the antenna of the external RF reading device is electrically connected to a portion of the housing, such as the dome of the housing, such that the portion of the housing acts as the antenna. In another embodiment, the device within the housing is electrically connected to a housing component. In another embodiment, a gasket, typically located between the housing dome and the housing base, is used to pass information from within the housing to an external device.

DETAILED DESCRIPTION OF THE INVENTION

Figure 1:
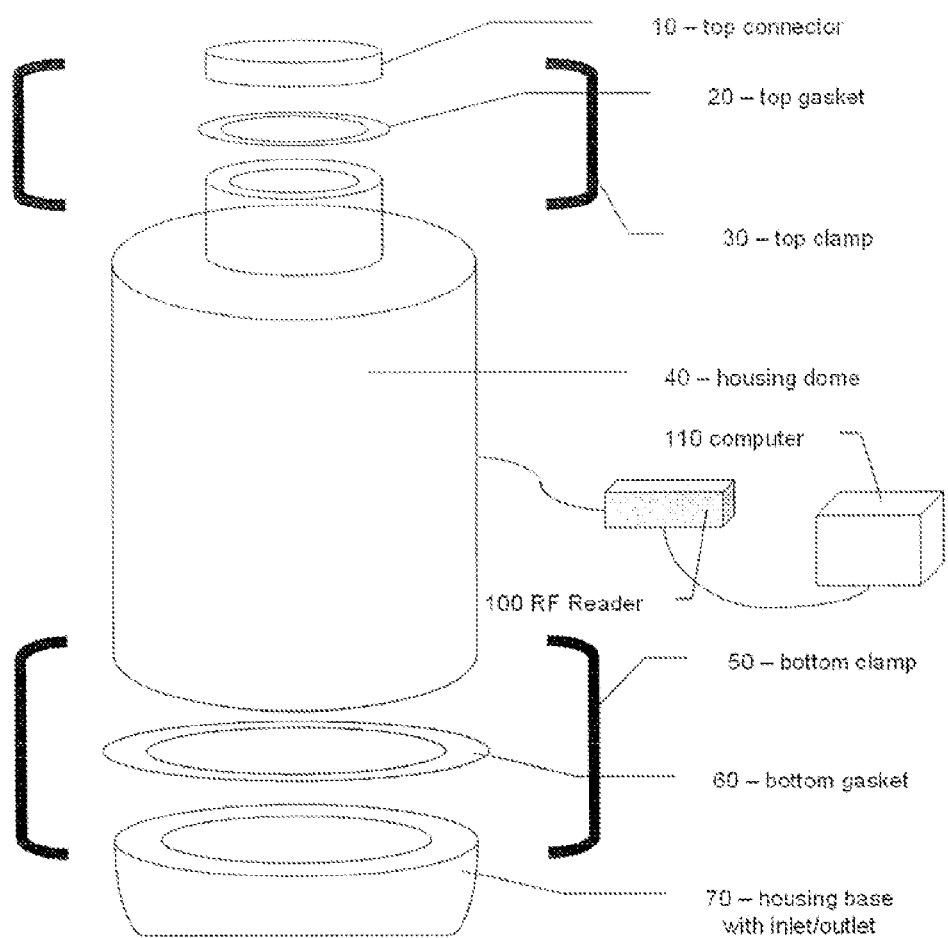
FIG. 1 illustrates a first embodiment of the present invention.

FIG. 1 illustrates a representative filtering system in accordance with the present invention, such as that commercially available from Millipore Corporation and sold under the name Filter Cartridge Housing Series 2000. The filter assembly (not shown) is enclosed with a housing dome 40. The filter assembly has a porous membrane, through which certain materials are able to pass, and the corresponding structure or frame necessary to support this membrane. In certain embodiments, the housing dome is constructed of a non-corrosive, durable material, such as but not limited to stainless steel and other metals or an assembly of conductive and insulative materials. Typically, the housing dome 40 has an opening 45 at the lower end, so that it can be connected to a suitable housing base 70. The housing base 70 usually contains the various inlets and outlets that allow fluid communication with the filter assembly. For example, fluids can flow into the housing, pass through the membrane of the filter assembly to be filtered and then be drained from the filter assembly through the housing base. Like the housing dome, the base is typically constructed of a non-corrosive material, such as stainless steel. The housing dome 40 is attached to the housing base 70 so as to form a liquid-proof and airtight seal. In some embodiments, the dome 40 is screwed into the housing base 70. In other embodiments, the housing dome 40 is secured to the housing base 70 through the use of a bottom clamp 50. The bottom clamp can be constructed of any suitable material, capable of holding these two components together. Typically, a bottom gasket is positioned between the housing dome 40 and the housing base 70 to insure the integrity of the seal between these components. Preferably, the bottom gasket 60 is constructed using a flexible material, such as but not limited to rubber.

In one embodiment, the housing dome 40 may also have an opening 48 at the upper end. In this embodiment, a top connector 10 is used to seal this opening. This connector is constructed from a suitable non-corrosive material. As with the bottom opening, the top connector may be screwed to the housing dome, or held in place using a top clamp 30. The top clamp can be constructed of any suitable material, capable of holding these two components together. Typically, a top gasket 20 is positioned between the housing dome 40 and the top connector 10 to insure the integrity of the seal between these components. Preferably, the top gasket 20 is constructed using a flexible material, such as but not limited to rubber.

As described above, within the housing dome are one or more filter assemblies (not shown). These filter assemblies can be simply a porous material, such as pleated paper. Alternatively, the filter assembly may be more complex; for example, comprising a frame, such as of plastic, and a porous material. Within the housing are electronic circuits, such as RFID tags, which can be used to store various types of information about the components. For example, the electronic circuit may include information such as the lot number, production date, test parameters, number of cycles used and other characteristics, properties, operating parameters and/or metrics. For example, these electronic circuits may be attached or embedded in the filter assemblies, and supply data associated with the filter assembly.

Outside of the housing dome is a device capable of communicating with these electronic circuits, or tags. In one embodiment, a device 100, such as an RFID reader, is utilized. This device can be any RFID reader, commercially available from a number of companies. Alternatively, it can be a proprietary reader. The device 100 is in communication with, either directly via a wired connection, or indirectly via a wireless connection, a computer 110. Alternatively, the device may only be in contact with the computer 110 intermittently. For example, the device may collect a variety of data and store that information internally. At some later time, the device is in communication with (either via a wired or wireless connection) a computer 110. At this time, the device transfers internally stored data to the computer. The actual interaction between the device 100 and the computer 110 is not critical and a variety of methods are possible and known to those skilled in the art. Consequently, the present invention is not limited to any particular embodiment.

Attempting to pass a signal through the housing dome, especially if it is constructed from stainless steel, can be difficult, if not impossible. However, the issue of transmitting information from within the housing dome 40 to the external reader 100 is resolved in a number of ways by the present invention.

In a first embodiment, housing dome 40 is electrically isolated from housing base 70, preferably by utilizing an electrically nonconductive gasket, such as one constructed from rubber. In addition, the means for attaching the dome to the housing base is also non-conductive. For example, the bottom clamp 50 is constructed from non-conductive material, such as thermoplastic or other suitable materials. In this way, the housing base can be grounded, if desired, while the housing dome is kept electrically isolated from it. The dome is preferably constructed of an electrically conductive material, such as copper or stainless steel.

Since the housing dome is not grounded or electrically connected to any other components, it can be used to assist in transmitting signals from within the dome to the external device, and vice-versa. In one embodiment, the device, or RF reader, 100 is physically in contact with the housing dome 40, so that the housing dome serves as the antenna for the device. Thus, the housing dome serves to transmit signals from the device or RF reader to inside the housing, and also serves to receive any signals transmitted from within the housing. In this embodiment, the dome is configured as a ¼ wave antenna installment. In this case, the antenna is configured as a monopole, or whip antenna, wherein only one end of the traditional dipole antenna is used. Those of ordinary skill in the art appreciate that some tuning of the amplitude of the transmitted signals may be required to optimize performance. The embodiments do not limit the shape or materials of construction of the dome to allow someone skilled in the art to tune the effective antennas for optimum performance.

In a second embodiment, the housing dome and housing base are isolated from one another, as described above, and both are also isolated from ground. As in the first embodiment, the housing dome is connected to one pole of the device or reader antenna. However, since the housing base is also isolated from ground, it can function as the other pole. Thus, the housing dome and the housing base each function as a pole for a dipole antenna. This is a double electrically floating installment, or a standard dipole antenna. The housing dome and the housing base are each energized by the reader and transmit and receive signals from within the housing.

In a third embodiment, the dome is kept electrically isolated from the base as described above. As above, the dome is preferably constructed of an electrically conductive material, such as stainless steel. The dome is then used as an electrical conduit to transmit information from the embedded device directly to the external reader, as though there were a wire between the devices. Preferably, a serial communication protocol is employed between the circuitry within the housing and the external reader. By having both the reader and the circuitry in physical contact with the housing dome, an electrical connection can be made between the internal circuit and the reader.

Figure 2:
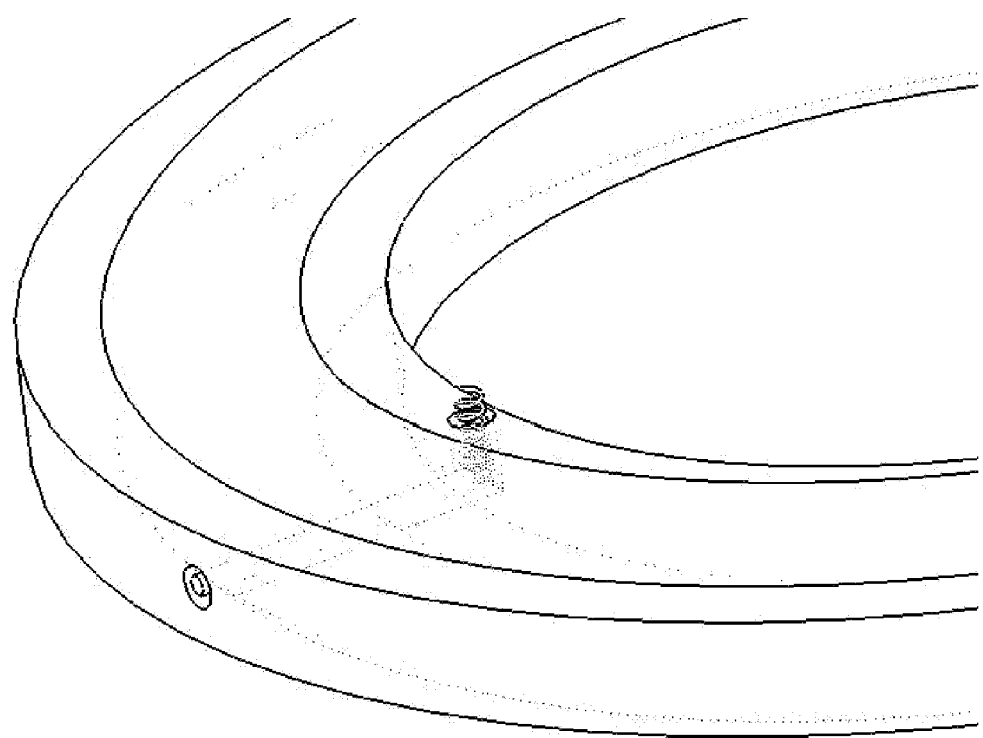
FIG. 2 illustrates a second embodiment of the present invention.

Alternatively, the gasket, which is in the shape of an "O", that separates the housing dome from the housing base can be used to pass signals from within the housing to the external environment. In one embodiment, a channel or feed through exists in the gasket, in which electrical wires can be placed. This channel, or feedthrough, extends from the portion of the gasket that forms the inner circumference, to the portion of the gasket that forms the outer circumference. Referring to FIG. 2, the channel 200 is visible at the outer edge of the gasket 210. Thus, rather than having the circuitry in physical contact with the housing dome, as described above, a wire, or set of wires, is used to connect the internal circuitry to the external device or reader. The type of communication used and the particular protocol are implement decisions and are all within the scope of the present invention.

As a modification to the above embodiments, the electrical connection within the gasket 210 is attached to the housing components. Since the gasket is typically under compression when in use, it is possible to guarantee a connection between the gasket and the housing dome (and housing base). In one embodiment, shown in FIG. 2, a small spring or springs 220 is added to the gasket 210 to insure that the electrical connections are in physical contact with the dome. In another embodiment, raised contact pads are located on the gasket and a physical connection is created because of the compression force exerted by the clamps. In the preferred embodiment, the channel 200 does not extend completely through the gasket. Rather, it extends a portion of the way into the gasket, where it is then made to contact with the dome or base. This mechanism provides a simpler method of attaching the antenna of the external device to the dome. For example, the antenna of the external device is connected to the gasket only, with the gasket providing the connection to the dome. In this way, the dome is unfettered by wires or other connection means. This allows the dome to be easily removed from the housing base, and later replaced. In one embodiment, the gasket includes a connector on the outer circumference, suitable for an antenna connection. The antenna of the external device is then connected to this connector, typically by a cable or other suitable means. Within the gasket, the signal is passed, preferably via one or more wires, to a location where it is guaranteed to contact the housing dome, thereby making the connection between the housing dome and the antenna of the external device. Similarly, two separate sets of contact mechanisms, one on the upper side of the gasket facing the housing dome, and one on the lower side of the gasket, facing the housing base, can be utilized. In this way, separate (or the same) signals can be supplied to the housing dome and the housing base, in accordance with an earlier embodiment.

What is claimed is:

1. A method of communicating between an external device and a filtering assembly having electronic circuitry, where said filtering assembly is located within a housing, comprising:
  employing a housing comprising an electrically conductive housing dome and a housing base;
  placing an electrically insulating gasket between said dome and said base to keep them physically and electrically isolated;
  pressing said housing dome and housing base together to create a liquid tight seal; and
  employing an external device adapted to utilize an antenna, wherein said housing dome is in communication with said device so as to serve as one pole of said antenna, to communicate with said filtering assembly.

2. The method of claim 1, wherein said housing base is grounded.

3. The method of claim 1, wherein said housing base is in communication with said device to serve as a second pole of said antenna.

4. The method of claim 1, wherein said housing dome and said housing base are pressed together using an electrically nonconductive clamp.

5. The method of claim 1, wherein said gasket has an inner and outer circumference and comprises an electrical channel in communication with said housing dome and said outer circumference, further comprising connecting said electrical channel to said external device.

6. The method of claim 5, wherein said electrical channel terminates at said outer circumference at a connector; and wherein said external device is connected to said connector.

7. The method of claim 5, further comprising locating a contact mechanism on said gasket so as to maintain said electrical channel in communication with said housing dome.

8. The method of claim 7, wherein said contact mechanism comprises contact pads located on said gasket.

9. The method of claim 7, wherein said contact mechanism comprises springs located on said gasket.

10. The method of claim 5, wherein said gasket comprises a second electrical channel in communication with said housing base and said outer circumference, further comprising connecting said second electrical channel to said external device to serve as a second pole of said antenna.

11. The method of claim 10, further comprising locating a contact mechanism on said gasket so as to maintain said second electrical channel in communication with said housing base.

12. The method of claim 11, wherein said contact mechanism comprises contact pads located on said gasket.

13. The method of claim 11, wherein said contact mechanism comprises springs located on said gasket.

* * * * *